(12) United States Patent
Balkesen et al.

(10) Patent No.: US 8,380,737 B2
(45) Date of Patent: Feb. 19, 2013

(54) COMPUTING INTERSECTION OF SETS OF NUMBERS

(75) Inventors: Cagri Balkesen, Zurich (CH); Markus T. Buehler, Weil im Schoenbuch (DE); Rainer Dorsch, Dettenhausen (DE); Guenther Hutzl, Sindelfingen (DE); Michael W. Kaufmann, Stuttgart (DE); Daniel Pfefferkorn, Rostock (DE); David Rohr, Mannheim (DE); Stefanie C. Scherzinger, Munich (DE); Thomas Schwarz, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/233,095

(22) Filed: Sep. 15, 2011

(65) Prior Publication Data

US 2012/0158774 A1    Jun. 21, 2012

(30) Foreign Application Priority Data

Dec. 17, 2010   (EP) ..................................... 10195546

(51) Int. Cl.
*G06F 7/00* (2006.01)
*G06F 17/30* (2006.01)

(52) U.S. Cl. ...................................................... 707/769
(58) Field of Classification Search ................... 707/769
See application file for complete search history.

(56) References Cited

U.S. PATENT DOCUMENTS

| | | | | |
|---|---|---|---|---|
| 5,432,852 A | * | 7/1995 | Leighton et al. | 380/30 |
| 5,778,333 A | * | 7/1998 | Koizumi et al. | 701/454 |
| 6,243,059 B1 | * | 6/2001 | Greene et al. | 345/88 |
| 7,440,963 B1 | | 10/2008 | Bello et al. | |
| 7,492,372 B2 | * | 2/2009 | Abshear et al. | 345/581 |
| 7,720,806 B2 | | 5/2010 | Piedmonte | |

(Continued)

FOREIGN PATENT DOCUMENTS

CN   101719155   6/2010

OTHER PUBLICATIONS

Goetz Graefe, Performance Enhancements for Hybrid Hash Join, Abstract, Jul. 28, 2010, ftp://ftp.cs.pdx.edu/pub/faculty/graefe/papers/hashjoin.ps or http://74.125.155.132/scholar?q=cache:N5VKg7C4oiAJ:scholar.google.com/+%22Performance+Enhancements+for+Hybrid+Hash+Join+%22& hl=en&as_sdt=2000 or ftp://ftp.cs.pdx.edu/pub/faculty/graefe/papers/hashjoin.ps.

(Continued)

*Primary Examiner* — Merilyn Nguyen
(74) *Attorney, Agent, or Firm* — Anthony V S England; Ingrid M Foerster; Frank E Levine

(57) ABSTRACT

First and second sets of numbers are received in an input range, which is separated into sub ranges. A first sub range is processed by initializing bits of a memory to a first logical state and by changing the initial state of each of the bits corresponding to a received number of the first set that is within the first sub range. Each number received in the second set is compared to a bit in the memory to identify a set of received numbers that are in the first sub range and that are in both the first set and the second set. The comparing is responsive to detecting a change of initial state of any bit in the memory during the processing of the first sub range. The processing and comparing is repeated for remaining sub ranges to identify received numbers that are in both the sets.

20 Claims, 9 Drawing Sheets

U.S. PATENT DOCUMENTS

| | | | |
|---|---|---|---|
| 7,739,313 B2* | 6/2010 | Mishra et al. | 707/803 |
| 7,831,536 B2* | 11/2010 | Ghosh et al. | 706/46 |
| 2002/0138353 A1 | 9/2002 | Schrelber | |
| 2003/0066033 A1 | 4/2003 | Direen, Jr. | |
| 2005/0131895 A1 | 6/2005 | Harbarth et al. | |
| 2007/0282981 A1* | 12/2007 | Cohen et al. | 709/221 |
| 2008/0079725 A1 | 4/2008 | Sagalov | |

OTHER PUBLICATIONS

Sort-merge join—Wikipedia, the free encyclopedia, Aug. 20, 2011, http://en.wikipedia.org/wiki/Sort-merge_join.

Hash join—Wikipedia, the free encyclopedia, Aug. 20, 2011, http://en.wikipedia.org/wiki/Hash_join.

* cited by examiner

COMPUTING INTERSECTION OF SETS OF NUMBERS

CROSS-REFERENCE TO RELATED APPLICATIONS

This invention claims priority to the foreign application 10195546.6 filed Dec. 17, 2010 in the European Patent Office.

BACKGROUND

1. Field

The invention relates to the field of computer field of data processing. More particularly to a program product, method, and system for computing set intersection of a first and a second unordered set of discrete members utilizing an acceleration unit. The present invention may be used for performing query processing in a database.

2. General Background

This invention focuses on the problem of computing set intersection. That is, given two sets of numeric identifiers, the task is to compute a third set that contains all identifiers that occur in both the first and the second set.

Set intersection is a basic problem in computer science, and has a variety of applications. For example, Index-ANDing in database query evaluation calculates set intersection of property index tables. Also hit list joining in email archiving calculates set intersection. Hit list joining is used by IBM® Enterprise Content Management (ECM) software, for example, to check access rights of users against access rights of documents. (IBM is a registered trademark of International Business Machines Corporation.) This is also an instance of the set intersection problem, and the long run times of the current software implementation are limiting the scalability of the software in terms of number of concurrent users.

There are two established classes of methods for computing set intersection. For this discussion, no order among the members of a first, second, or third set is assumed. It is further assumed that n denotes the combined number of elements in the first and second input set (S1 and S2 respectively), i.e. n=|S1|+|S2|.

Sort-merge based methods generally proceed in two phases. The first and second sets are sorted, and then a linear pass is made over both the sorted first set and the sorted second set, and the sets are merged into a third set that contains the (sorted) set intersection result. The runtime performance of sort-merge based methods is in the order of $O(n\_log\ n)$, due to the sorting phase. The method can be implemented in-place, i.e., no additional memory is required for auxiliary data structures. The third set can be output as it is being computed, so no additional memory is required for buffering the output. In database query processing, the sort-merge-join is an operator from this class of methods.

Hash based methods or Bloom filter based methods employ a hash function that maps input values to a fixed interval of output values. The values computed by the hash function are treated as addresses to slots in a hash table. With Bloom filter based methods, the output values of the hash function address bits in a bit vector. Since both approaches are similar, only the case of hash based methods is discussed.

This class of methods generally proceeds in two phases. In the build phase, the hash function is applied to all members of the first set. Entries are made into the respective slots of the hash table. In the probe phase, the hash function is applied to all members of the second set. By looking up the respective slots in the hash table, a case distinction is required. If the respective slot in the hash table is empty, then the member is only part of the second set, but not the first set. It is therefore not part of the set intersection. If the respective slot of the hash table is not empty, then the member may be part of the set intersection output. Since hash values can produce collisions, i.e. different input values may be mapped on to the same output value; collision resolution is required to determine whether the member from the second set is indeed identical to a member of the first set. This requires maintaining a mapping between entries in the hash table and members of the first set. Collision resolution thus determines whether the member of the second set is indeed part of the intersection output, i.e., is a true positive, or not, i.e., is a false positive. The average runtime performance of this class of methods is linear to the size of the input, yet the runtime may deteriorate to $O(n*n)$ in the worst case, when the hash function mainly produces false positives. Regarding memory consumption, hash-based methods cannot be implemented in-place, as they require additional data structures. In particular a data structure representing the hash table, and means for providing the mapping from entries in the hash table back to the original values for collision resolution are required. In database query processing, hash-join operators or Bloom filters belong to this class of methods.

The discussed solutions are established software solutions for computing set intersection. Since they are CPU-intensive, performance may be improved by offloading this computation onto an accelerator board, such as an FPGA board attached to a PCI Express bus. In a basic scenario an accelerator board is attached to a host computer via a communication bus. The accelerator board contains accelerator hardware, and typically some on-board memory such as banks of SRAM and DRAM. Typically, the on-board memory forms a memory hierarchy, for instance where SRAM is smaller in capacity but faster to random access, and DRAM is larger in capacity but has longer random access times.

The optimization goals in this scenario are runtime efficiency and memory efficiency. The optimization of runtime efficiency accelerates the runtime of the system, and the optimization of memory efficiency makes efficient and parsimonious use of the available memory resources, as this directly affects the size of the input that can be offloaded to the accelerator board. The memory efficiency comes into play since offloading scenarios operate in a three-phase approach, of first sending all required data onto the accelerator board, then performing the computation on the board, and finally sending data back from the board to the host computer.

The on-board memory is limited, and fetching additional data during the computation phase can be prohibitively expensive in terms of communication latency. This implies that the capacity of the on-board memory is to be leveraged to the fullest, to maximize the size of the input that can be handled.

With these goals in mind, the drawbacks of naively transferring the existing software solutions to accelerator boards are that the sort-merge based approach has a high runtime complexity when compared to the average runtime of hash-based approaches. On the other hand the hash based approaches cannot be implemented in-place, and are thus not as efficient in their memory usage as the sort-merge based approach.

In the Patent Publication U.S. Pat. No. 7,720,806 B2, "SYSTEMS AND METHODS FOR DATA MANIPULATION USING MULTIPLE STORAGE FORMATS" by Piedmonte systems and methods for storing and accessing data are disclosed. Algebraic relations may be composed that each defines a result equal to a requested data set. The algebraic relations may reference other data sets in storage. Some of the data sets may contain the same logical data stored in different physical formats and/or in different locations in the data store. One of the algebraic relations may be selected for use in providing the requested data set based, at least in part, on the physical format and/or locations of the data sets referenced in the algebraic relations. In other examples, algebraic relations may be selected based, at least in part, on the speed and available bandwidth of the channel(s) used to retrieve data sets referenced in the algebraic relation. Functions may be used to calculate the algebraic relation using the data sets retrieved from storage. The functions may be specifically formatted based on the physical formats of the data sets provided as operands to the functions. Example embodiments may include a data store for storing data sets, a data set information store for storing information regarding the data sets, an algebraic relation store for storing algebraic relations between data sets, an optimizer for using the algebraic relations to optimize storage and access of data sets from the data store and a set processor for calculating algebraic relations to provide data sets. In example embodiments, modules may be provided by a combination of hardware, firmware and/or software and may use parallel processing and distributed storage in some example embodiments.

SUMMARY

According to one embodiment of the invention, there is provided a computer program product for computing a set intersection of a set of integers. The computer program product comprising a computer readable storage medium having computer readable program code embodied therewith. The computer readable program is configured with an interface for computing a set intersection accepting as input a first set S1 of discrete numbers in a known range of consecutive discrete numbers IR and a second set S2 of discrete numbers in the known range IR, and configured to return the intersection to the application calling the interface. The interface configured to separate the range IR into one or more sub ranges to cover the full range IR. Each sub range Ri is processed by initializing a first Random Access Memory (RAM) with at least as many bits as the sub range Ri to a first known logical state, and changing the state of all bits in the first RAM corresponding to a bit representing the existence of the number in the sub range Ri in the first set S1. Responsive to the interface detecting a change of state of any bit in the first RAM during the processing of the sub range Ri, comparing every number in S2 in the range of IR to the corresponding bit position in the first RAM to identify a set of numbers in the intersection of S1 and S2 in the sub range Ri. Responsive to the interface completely processing the range IR by processing all the sub ranges, returning the set of numbers in the intersection to the application calling the interface.

According to another embodiment of the invention, there is provided a method for computing a set intersection of sets of numbers comprising providing an interface for computing the intersection accepting as input a first set S1 of discrete numbers that stem from a known range of consecutive discrete numbers IR, a second set S2 of discrete numbers that stem from the known range IR and producing the intersection. The interface separating the range IR into a set of one or more sub ranges to cover the full range IR and processing a sub range Ri from IR by initializing a first RAM with at least as many bits as the sub range Ri to a first known logical state, changing the state of all bits in the first RAM corresponding to a bit representing the existence of the number in the sub range Ri in the first set S1. Responsive to detecting a change of state of any bit in the first RAM during the processing of the sub range Ri, comparing every number in S2 in the range of IR to the corresponding bit position in the first RAM to identify a set of numbers in the intersection of the S1 and S2 in the sub range Ri, and returning the intersection to an application calling the intersection.

In another embodiment of the invention, there is provided a system for computing a set intersection of sets of numbers comprising: a first processor, an application running on the first processor, a second processor, and an interface for computing intersections of numbers. The interface is further configured for accepting as input a first set of discrete numbers R1 in a known range IR and a second set of discrete numbers R2 in the known range IR, the interface returning a third set of numbers R3 being the intersection of the first set of numbers and the second set of numbers. While computing the intersection, the interface separates the range IR into a set of one or more sub ranges to cover the full range IR and executes portions of its code on a plurality of processors including the second processor. The interface processes a sub range Ri from IR by initializing a first RAM with at least as many bits as the sub range Ri to a first known logical state, changes the state of all bits in the first RAM corresponding to a bit representing the existence of the number in the sub range Ri in the first set S1. Responsive to detecting a change of state of any bit in the first RAM during the processing of the sub range Ri, the interfaces compares every number in S2 in the range of IR to the corresponding bit position in the first RAM to identify a set of numbers in the intersection of the first set S1 and the second set S2 in the sub range Ri. Responsive to completely processing the range IR by processing all the sub ranges, the interface returns the set of numbers in the intersection to the application calling the interface.

DRAWINGS

The present invention is illustrated by way of example and is not limited by the shape of the figures of the drawings in which embodiments of the present invention, as described in detail below, are shown in the drawings.

DETAILED DESCRIPTION

Embodiments of the invention are described below with reference to drawings in detail.

In the present description sets of values are considered, e.g. {1,2,3,10} is the set containing the numeric values 1,2,3, and 10. As is common, no particular order is assumed on the elements in a set and the values in a set are referred as set members. Sets may be implemented as lists, but embodiments of the present invention are not limited to this method of implementation. Further an interval is referred to a fixed range of values. For instance, let $\aleph$ denote the natural numbers. The mathematical notation $[1, 100] \subset \aleph$ denotes the range of all natural numbers starting from $1,\overline{2,3}, \ldots$ up to and including 100.

Let $[1,100] \subset \aleph$ be an interval, for example. Then the first set $\{1,5,66,99\}$ and the second set $\{6,8,66,99,100\}$ are both subsets of this interval and meet the criteria specified above.

Further, the result of set intersection is the third set $\{66,99\}$ consisting of the set members that are contained in the first and the second set. The natural numbers in an interval or range may be referred to as discrete numbers or integers.

The technical problem underlying the present invention is to provide a method for computing set intersection of a first and a second unordered set of discrete members and a acceleration unit for computing set intersection of a first and a second unordered set of discrete members, which are able to optimize runtime and memory efficiency and solve the above mentioned shortcomings and pain points of prior art method and systems; and to provide a method for performing query processing in a database using the method for computing set intersection of a first and a second unordered set of discrete members and a data processing system for performing query processing in a database using the acceleration unit for computing set intersection of a first and a second unordered set of discrete members.

Figure 1:
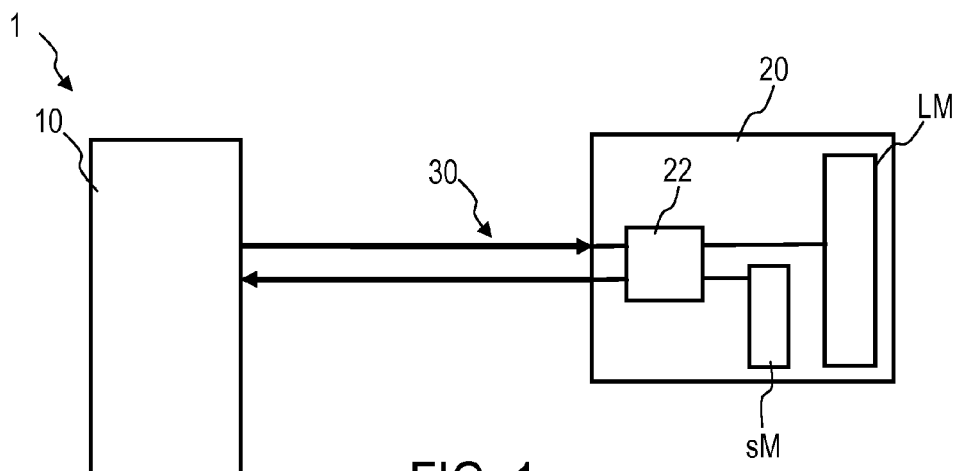
FIG. 1 is a schematic block diagram of system architecture in an offloading scenario, in accordance with an embodiment of the present invention.

FIG. 1 shows system architecture 1 in an offloading scenario, comprising an accelerator unit 20 attached to a host computer 10 with use of a communication bus 30.

Referring to FIG. 1 the accelerator unit 20 carries control logic 22 and on-board memory that forms a memory hierarchy, consisting of first memory LM of large capacity but slow random access rates and second memory sM of small capacity but fast random access rates. The large memory unit LM is able to hold at least a first and second set S1 and S2. The shown system architecture is typical for today's off-the-shelf FPGA boards 20 with accelerator hardware 22, and a memory hierarchy consisting of two banks of 512 MB DRAM as first memory LM and two banks of 8 MB SRAM as second memory sM, for example. Such FPGA boards 20 can be attached to off-the-shelf computers 10 via PCI express 30, to act as CPU co-processors.

FIGS. 2 to 6 show the acceleration unit 20 being part of system architecture 1 shown in FIG. 1 illustrating different steps of a method for computing set intersection of a first and a second unordered set 51, S2 of discrete members, in accordance with a first embodiment of the present invention. Set intersection on the accelerator unit 20 works in divide-and-conquer approach. The members of the first and second set 51, S2 originate from an interval IR [low, high].

Figure 2:
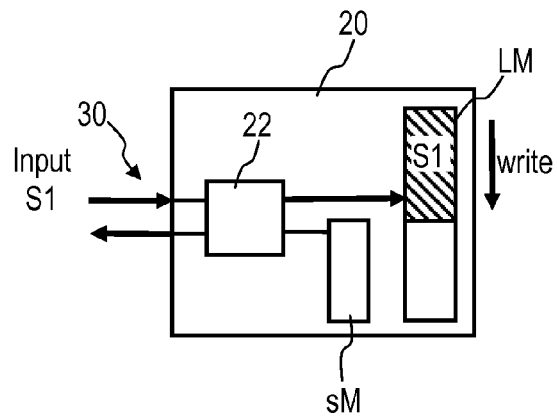
FIGS. 2 to 6 are schematic block diagrams of an acceleration unit being part of system architecture shown in FIG. 1 illustrating different steps of a method for computing set intersection of a first and a second unordered set of discrete members, in accordance with a first embodiment of the present invention.

Referring to FIG. 2, the accelerator unit 20 receives the first set S1 as a stream of values. The members of the first set S1 are written consecutively into the first memory unit LM, e.g. starting from the lowest bit with writing direction towards the highest bit, and followed by some symbol marking the end of the first set S1.

Figure 3:
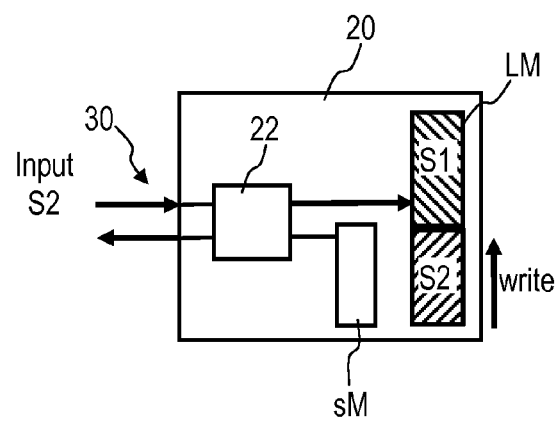

Referring to FIG. 3, the accelerator unit 20 receives the second set S2 as a stream of values. The members of the second set S2 are written consecutively into the first memory unit LM, e.g. starting from the highest bit with writing direction towards the lowest bit.

The accelerator unit 20 computes set intersection in a divide-and-conquer approach. Let |sM| be the number of bits in the second memory unit sM, wherein the second memory unit sM functions as a bit vector BV, where the first bit has position 1 and the last bit has position |sM|. For addressing positions within the bit vector BV the function pos(x), with x in [low, high], is defined as follows:

$$pos(x) = x \bmod |sM| \text{ if } x \bmod |sM| \neq 0, \text{ otherwise } pos(x) = |sM|.$$

The divide-phase produces several iterations. For i=1 to $\lceil (high-low)/|sM| \rceil$, i.e. for each iteration the conquer-phase is performed. Let range IR be the interval $[(i-1)*|sM|+1, i*|sM|]$, the following steps are performed for each sub range R.

First the focus is on the members of the first set S1 falling into a sub range R=[low, ..., low+|sM|], and the members of the second set S2 also falling into this sub range R. Now the set intersection between the subsets $S1 \cap R$ ([low, ..., low+|sM|]) and $S2 \cap R$ ([low, ..., low+|sM|]) is calculated in three steps.

Figure 4:
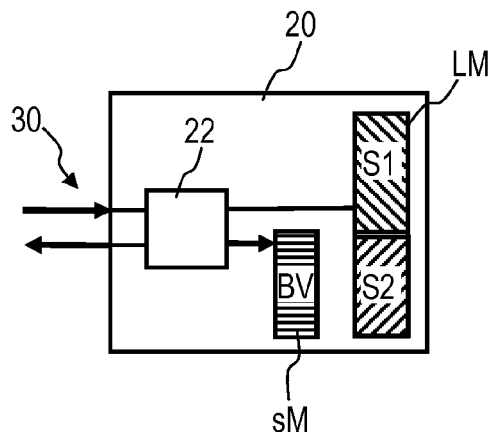

Referring to FIG. 4 the bit vector BV is initialized by setting all bits in second memory unit sM to a logical low level (0).

Figure 5:
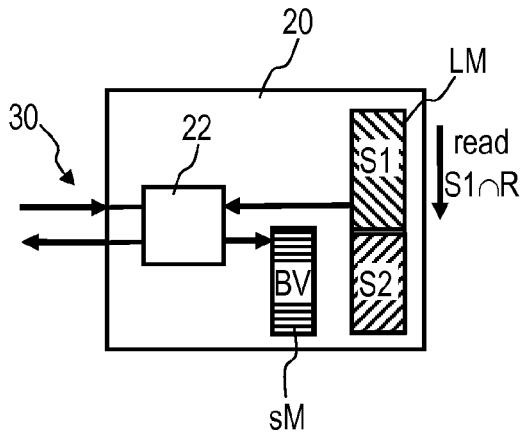

Referring to FIG. 5, for each member m of the first set S1 residing in the first memory unit LM direct addressing is performed by setting the bit with position pos(m) to a logical high level (1) in the second memory unit sM if m is in sub range R.

Figure 6:
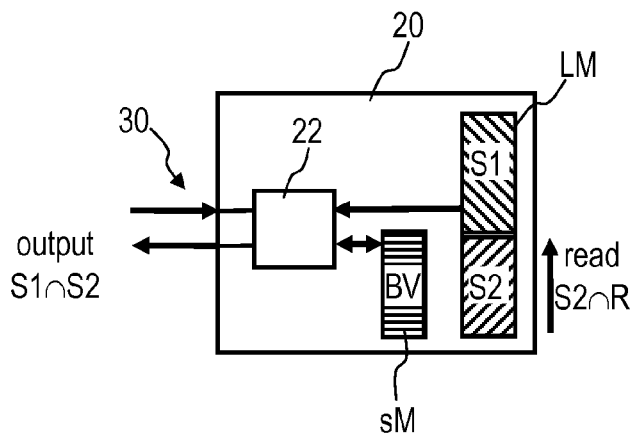

Referring to FIG. 6, for each member m of the second set S2 residing in the first memory unit LM, probing is performed by writing member m to the output if m is in sub range R and the bit with position pos(m) in the second memory unit sM is set to the logical high level (1). This means, that m is contained in both sets S1 and S2. It is thus part of the set intersection of S1 and S2, and written to the output.

By redefining the scope of the second memory unit sM to a different range, e.g. to a sub range R'=[low+|sM|+1, low+(2*|sM|)], another round of initialization, direct addressing, and probing is performed. This yields the set intersection results for the sets $S1 \cap R'$ ([low+|sM|+1, ..., low+(2*|sM|)]) and $S2 \cap R'$ ([low+|sM|+1, ..., low+(2*|sM|)]). Doing this repeatedly, eventually the complete input interval IR [low, high] is covered.

Practical experience shows that for realistic sizes of the first memory unit sM, e.g. two 8 MB SRAM banks on off-the-shelf FPGA boards, one or two repetitions are usually enough to cover large input intervals IR.

An effective shortcut can be applied to the probing step. Let R be the sub range considered in the current iteration. If no member of the first set S1 is in this sub range R, then $S1 \cap R$ is empty. Consequently, the set intersection $S1 \cap S2 \cap R$ is empty as well. So if the bit vector BV only carries bits with a low logical level (0) after direct addressing, the probing step for sub range R can be skipped, and direct addressing for the sub range R' of the next iteration may be computed. This improves the runtime by constant factors, as unnecessary computations are skipped.

An embodiment of the present invention operates sequentially, while the nature of the accelerator board may offer opportunities for parallelization. FIGS. 7 to 11 show such an acceleration unit 20' being part of system architecture 1 shown in FIG. 1 illustrating different steps of a method for computing set intersection of a first and a second unordered set S1, S2 of discrete members, in accordance with a second embodiment of the present invention.

Referring to FIGS. 7 to 11 the accelerator unit 20' carries a control logic 22 and on-board memory that forms a memory hierarchy, consisting of one first memory unit LM of large capacity but slow random access rates and two second memory units sM1, sM2 of small capacity but fast random access rates. The first memory unit LM is able to hold at least a first and second set S1 and S2.

If several banks of on-board second memory sM1, sM2 are available, the writing steps of the first and second set S1, S2 in the first memory LM of large capacity but slow random access rates remain unaffected, compared to the first embodiment. The initializing step of the banks of small but fast on-board second memory sM1, sM2, the direct addressing step and the probing step can be executed concurrently for n sub ranges R1, . . . , Rn, as explained next.

Referring to FIGS. 7 to 11 the acceleration unit 20' comprises two banks of small but fast on-board second memory sM1, sM2 in the second embodiment, where two sub ranges R1 and R2 are processed at the same time.

Figure 7:
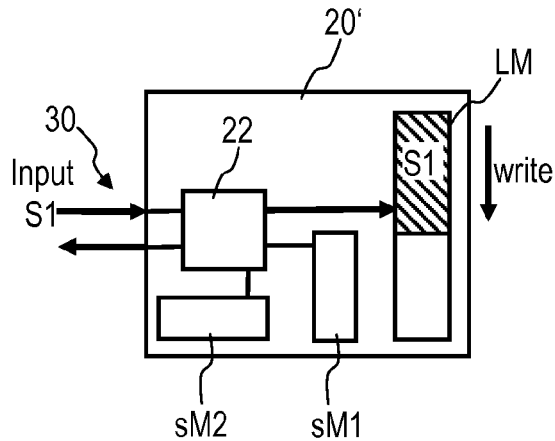
FIGS. 7 to 11 are schematic block diagrams of an acceleration unit being part of system architecture shown in FIG. b1 illustrating different steps of a method for computing set intersection of a first and a second unordered set of discrete members, in accordance with a second embodiment of the present invention.

Referring to FIG. 7, the accelerator unit 20' receives the first set S1 as a stream of values. The members of the first set S1 are written consecutively into the first memory unit LM, e.g. starting from the lowest bit with writing direction towards the highest bit, and followed by some symbol marking the end of the first set S1.

Figure 8:
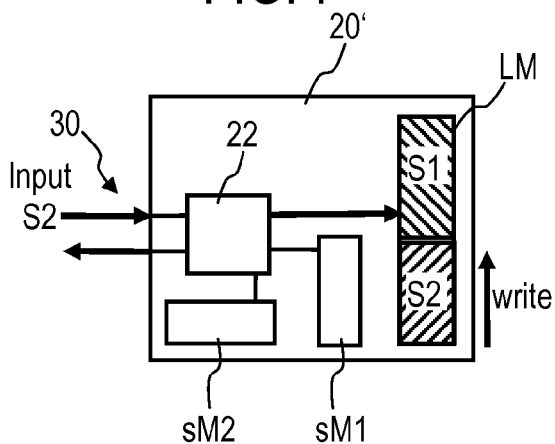

Referring to FIG. 8, the accelerator unit 20' receives the second set S2 as a stream of values. The members of the second set S2 are written consecutively into the first memory unit LM, e.g. starting from the highest bit with writing direction towards the lowest bit.

Figure 9:
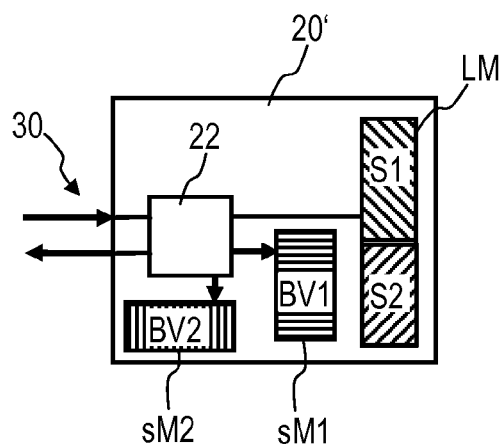

Since two instances sM1, sM2 of the small but fast memory bank are available, two iterations can be executed in parallel. Referring to FIG. 9 two bit vectors BV1, BV2 implemented by the memory banks sM1 and sM2 are initialized to a logical low level (0).

Figure 10:
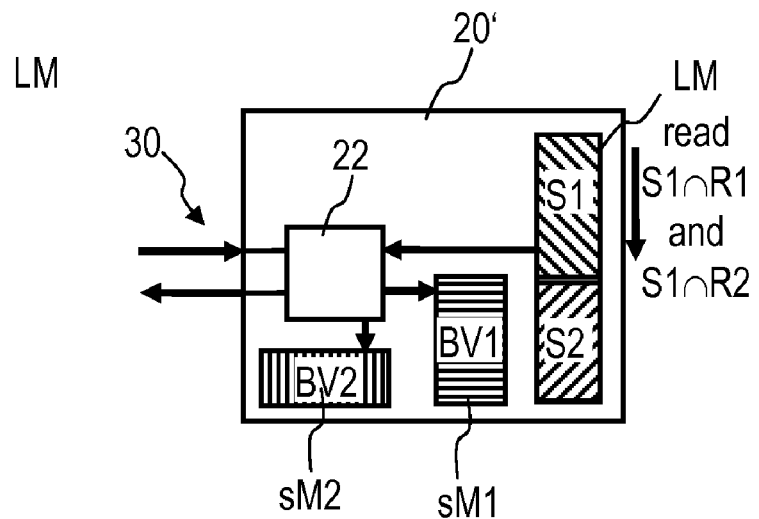

Referring to FIG. 10, direct addressing of the two small but fast second memory units sM1, sM2 is performed in parallel. A single pass over the members of the first input set S1, stored in first memory unit LM, is made. For all members that are in sub range R1, direct addressing is done on the first bit vector BV1 of second memory unit sM1. For all members that are in sub range R2, direct addressing is done on the second bit vector BV2 of second memory unit sM2.

Figure 11:
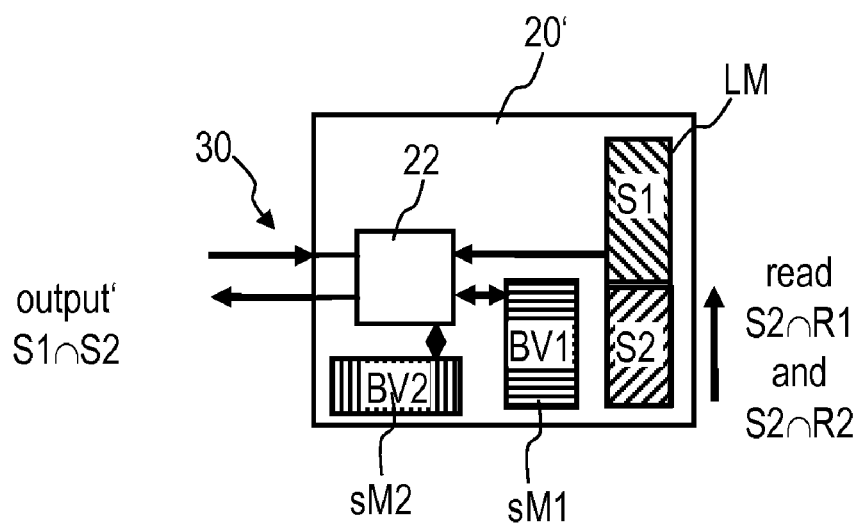

Referring to FIG. 11, probing is also performed in parallel. A single pass over the members of the second input set S2, stored in first memory unit LM, is made. For all members that are in sub range R1, probing is done on the first bit vector BV1 of second memory unit sM1. For all members that are in sub range R2, probing is done on the second bit vector BV2 of second memory unit sM2.

In this example, this speeds up the runtime of set intersection computation by a constant factor of two. In the general case, for n banks of small but fast on-board memory, a speed up of factor n can be reached.

If several banks of on-board memory are available that are large in capacity but show slow random access times, e.g. LM1, . . . , LMn, rather than a single one, those banks of on-board memory are logically treated as a single, consecutive bank of memory that has the combined capacity of all banks LM1, . . . , LMn.

If several channels are available that allow parallel access to the banks of on-board memory regardless whether first memory LM or second memory sM, this can be exploited by reading and writing in parallel, to push the runtime efficiency to the fullest.

Figure 12:
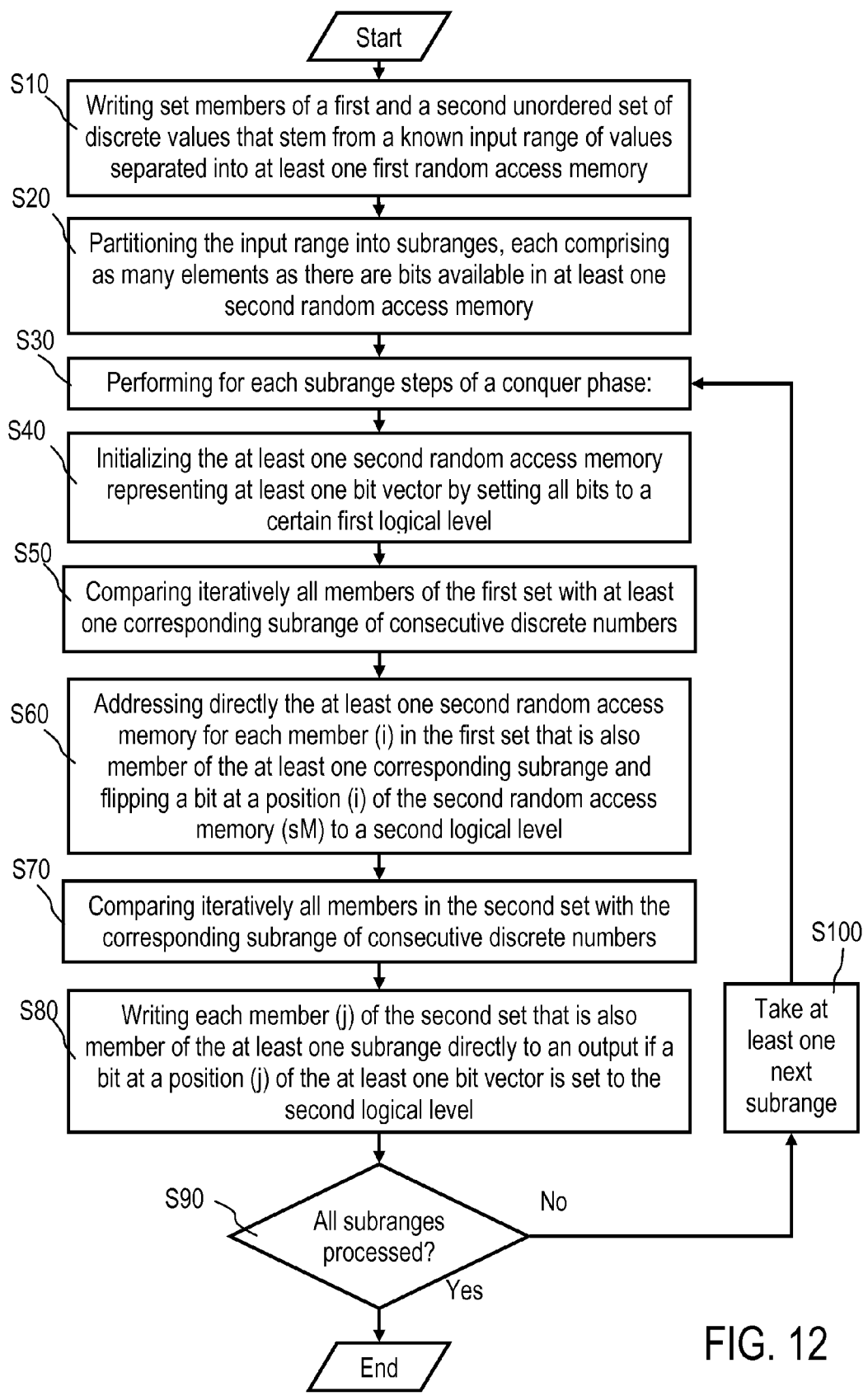
FIG. 12 is a schematic flow diagram of a method for computing set intersection of a first and a second unordered set of discrete members, in accordance with an embodiment of the present invention.

FIG. 12 shows a method for computing set intersection of a first and a second unordered set S1, S2 of discrete members, in accordance with an embodiment of the present invention.

Referring to FIG. 12, during step S10 discrete set members of a first and second unordered set S1, S2 that stem from a known input range IR of consecutive discrete numbers are written separately into at least one first random access memory LM. In step S20 the input range IR is partitioned into sub ranges R, R' R1, R2, each comprising as many set members as there are bits available in at least one second random access memory sM, sM1, sM2, wherein the at least one first random access memory LM comprises a larger capacity than the at least one second random access memory sM, sM1, sM2, but slower or equal access rate. In loop consisting of steps S30 to S100 for each sub range R, R' R1, R2 of consecutive discrete numbers following steps of a conquer-phase are performed iteratively. In step S40 at least one second random access memory sM, sM1, sM2 representing at least one bit vector BV, BV1, BV2 is initialized by setting all bits to a certain first logical level (0). In step S50 all set members in the first set S1 are compared iteratively with the corresponding sub range R, R', R1, R2. In step S60 the at least one second random access memory sM is addressed directly for each number (i) in the first set (S1) that is also set member of the corresponding sub range R, R', R1, R and a bit at position (i) of the at least one second random access memory sM is flipped to a second logical level (1). In step S70 all set members in the second set 2 are compared iteratively with the corresponding sub range R, R', R1, R2. In step S80 each number (j) of the second set S2 that is also set member of the sub range R, R', R1, R2 is written directly to an output if a position (j) of the at least one bit vector BV, BV1, BV2 is set to the second logical level (1). In step S90, it is checked if all sub ranges R, R', R1, R2 are processed. If not all sub ranges R, R', R1, R2 are processed the next sub range R, R', R1, R2 is taken in step S100 and steps S30 to S90 are repeated for this next sub range R, R', R1, R2. If all sub ranges R, R', R1, R2 are processed the process is finished.

Accordingly, in an embodiment of the present invention a method for computing set intersection of a first and a second unordered set of discrete members that stem from a known input range of consecutive discrete numbers comprises writing set members of the first set and the second set separated into at least one first random access memory; partitioning the input range into sub ranges, each comprising as many set members as there are bits available in at least one second random access memory, wherein the at least one first random access memory comprises a larger capacity than the at least one one second random access memory, but slower or equal access rate; performing iteratively for each sub range of consecutive discrete numbers the following steps of a conquer-phase: Initializing the at least one second random access memory representing at least one bit vector by setting all bits to a certain first logical level (0); comparing iteratively all set members in the first set with the corresponding sub range; addressing directly the at least one second random access memory for each number (i) in the first set that is also set member of the corresponding sub range and flipping a bit at position (i) of the at least one second random access memory to a second logical level (1); comparing iteratively all set members in the second set with the corresponding sub range; and writing each number (j) of the second set that is also set member of the sub range directly to an output if a position (j) of the at least one bit vector is set to the second logical level (1).

Further embodiments of the present invention, comprise writing set members of the first set consecutively into the at least one first random access memory starting from lowest bit with write direction towards highest bit.

Further embodiments of the present invention, comprise writing set members of the second set consecutively into the at least one first random access memory starting from highest bit with write direction towards lowest bit.

Further embodiments of the present invention, comprise marking end of the first set with a symbol written into the at least one first random access memory following the first set.

Further embodiments of the present invention, comprise skipping the comparing step of all set members in the second set with the corresponding sub range as part of the conquer-phase, if the at least one bit vector of the corresponding sub range carries only bits on the first logical level (0) after performing the direct addressing step.

Further embodiments of the present invention, comprise performing steps of the conquer-phase concurrently for (n) sub ranges if (n) second random access memories are available.

Figure 13:
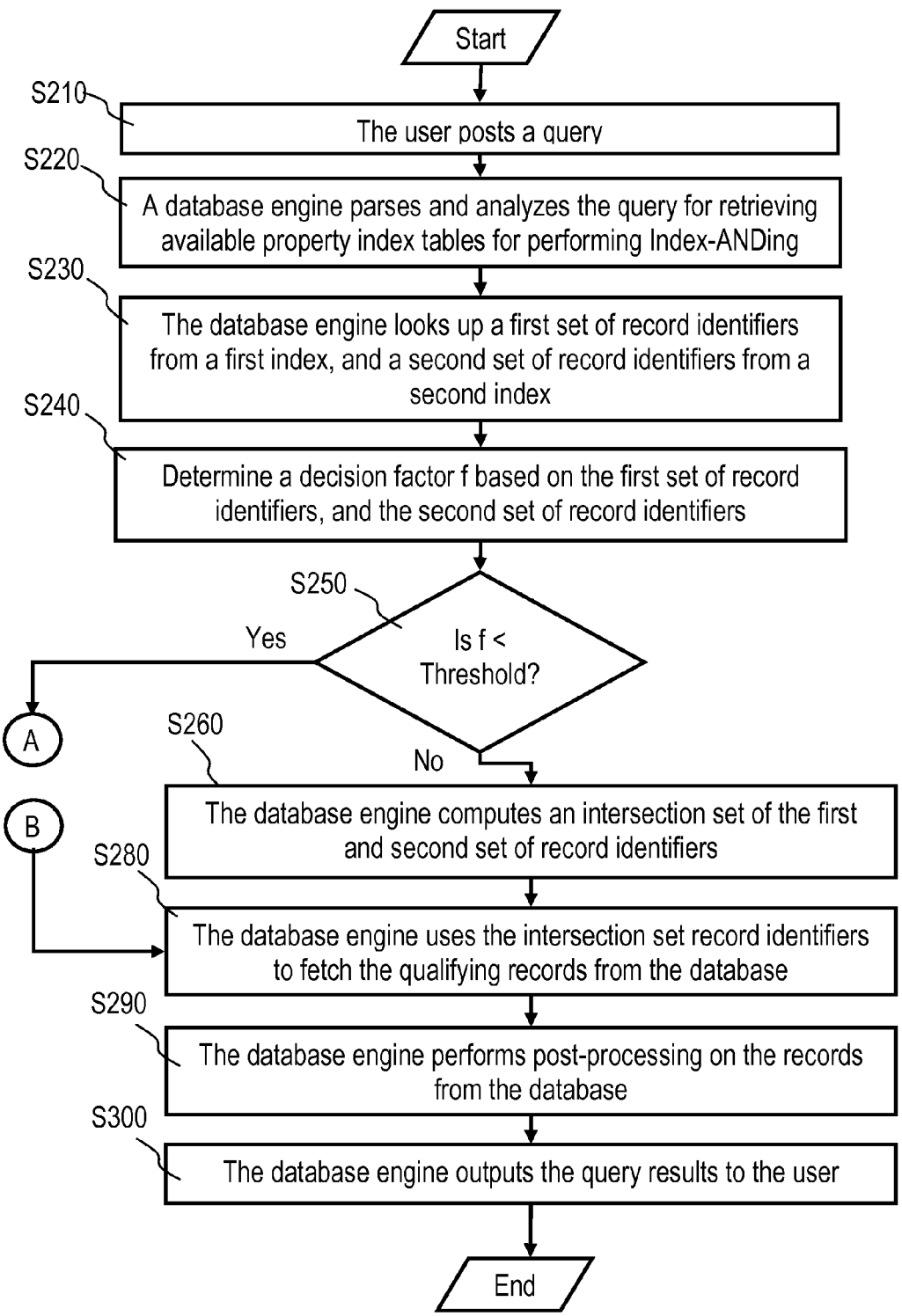
FIGS. 13 and 14 show a schematic flow diagram of method for performing query processing in a database, in accordance with an embodiment of the present invention.
Figure 14:
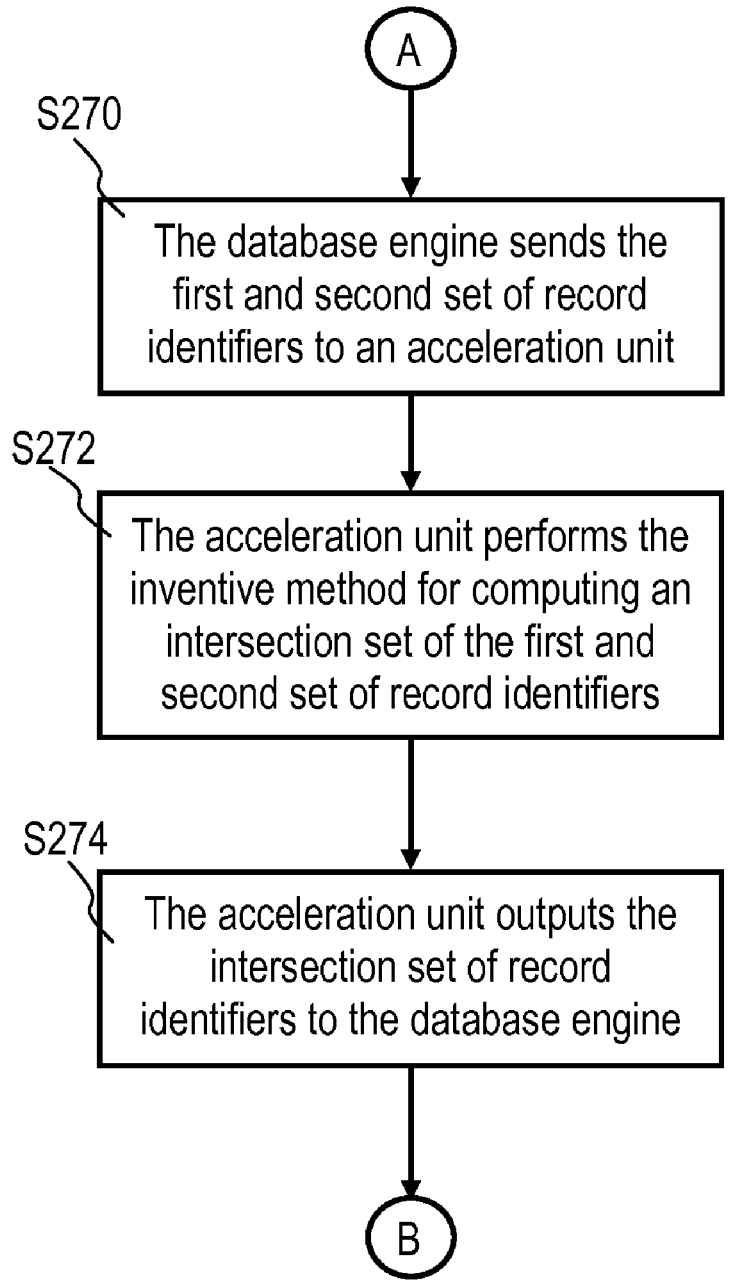

FIGS. 13 and 14 show a method for performing query processing in a database, in accordance with an embodiment of the present invention.

Referring to FIGS. 13 and 14, during step S210 a user posts a query. In step S220 a database engine 10 parses and analyzes the query for retrieving available property index tables for performing Index-ANDing. In step S230 the database engine 10 looks up a first set S1 of record identifiers from a first property index table and a second set S2 of record identifiers from a second property index table. In step S240 a decision factor f is determined based on the first set S1 of record identifiers and the second set S2 of record identifiers. In other words, in step S1 the database engine 10 is checking if first and second set S1, S2 are suitable for offloading calculation of an intersection set of record identifiers from the database engine 10 to an acceleration unit 20, 20'. In step S240 it is checked if the decision factor f is smaller than a given threshold value. If the decision factor f is smaller than the given threshold, which means that the first and second set S1, S2 are suitable for offload calculation, the database engine 10 is offloading the first and second set S1, S2 to the acceleration unit 20, 20' in step S270. During step S272 the acceleration unit 20, 20' is performing the method for computing set intersection of a first and a second unordered set of discrete members S1, S2 according to the steps S10 to S100 illustrated in FIG. 13. In step S274 the acceleration unit 20, 20' outputs the intersection set of record identifiers to the database engine 10. If the decision factor f is not smaller than the given threshold, which means that the first and second set S1, S2 are not suitable for offload calculation, the database engine 10 is computing the intersection set of the first and second set S1, S2 during step S260. In step S280 the database engine 10 uses the computed intersection set record identifiers to fetch the qualifying records from the database. During step S290 the database engine 10 is performing post-processing on the records from the database. In step S300 the database engine 10 outputs the query result to the user.

Figure 15:
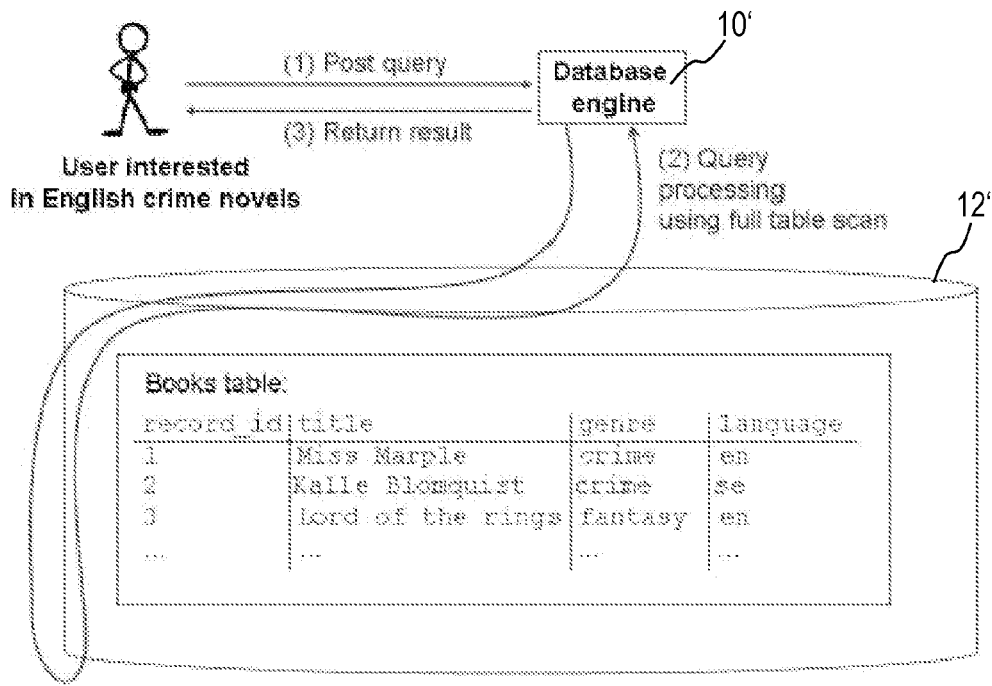
FIG. 15 is a conceptual view on database query processing.
Figure 16:
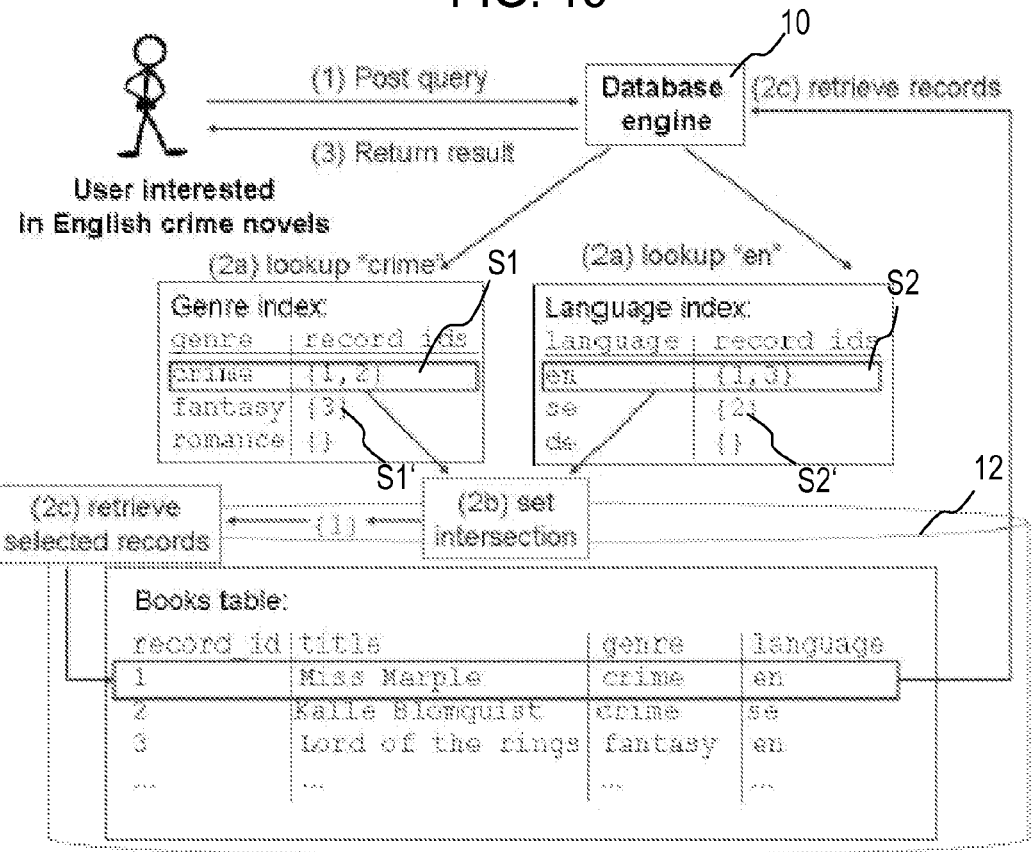
FIG. 16 is a conceptual view on database query processing using Index-ANDing.

FIG. 15 shows a conceptual view on database query processing; and FIG. 16 shows a conceptual view on database query processing using Index-ANDing. Note that FIGS. 15 and 16 provide a very simplified view on database query processing (e.g. the buffer pool, essentially a cache, has been omitted).

Referring to FIGS. 15 and 16 a real-life instance of the set intersection problem is explained as an example of FPGA-acceleration for database Index-ANDing. First an introduction to Index-ANDing in databases is given. A relational database maintaining a relational table with book records 12' is assumed. As is standard in relational database systems, each record in the table 12' has a unique record identifier. The book table 12' contains further information on books, such as the title, a genre, the language in which the book is written in, and so on. FIG. 16 sketches such a book table 12' in a relational database, with three records shown and further records omitted.

Physically, relational tables 12' are stored on disk, most likely requiring several blocks of disk storage. The record identifiers known as "row identifiers" in DB2® are the database-internal means to locate single records on disk. (DB2 is a registered trademark of International Business Machines Corporation.) The database maintains data structures that map record identifiers to the blocks on disk where the respective record resides.

When a new record is inserted into a relational table 12', a new record identifier is generated. In the particular case of XML processing in DB2, record identifiers (or "document identifiers" as they are called in the realm of XML processing) are generated by incrementing a counter. Consequently, the record identifiers are discrete values from a known interval IR bounded by the current maximum of the counter.

Referring to FIG. 15, the user posts a query (1), e.g. requesting all crime novels written in English. The database engine 10' parses the query, and accesses the table 12' containing book data. In a single scan over the records in the table 12', the database engine 10' selects all records that match the criteria specified by the user (2). The database engine 10' then returns the qualifying records to the user as the query result (3).

In this example, the complete book table 12' must be scanned. This is called a "full table scan." For large tables, and highly selective queries, full table scans can be prohibitively expensive in terms of I/O. All blocks on disk that are containing records for the table 12' need to be fetched into main memory for query processing. By creating indexes on tables, 12' full table scans can be avoided. The concept of indexes is discussed next.

Referring to FIG. 16 database administrators can accelerate query processing by creating indexes on tables 12. In the shown example, if users frequently filter the records in the books table 12 by language and genre, a database administrator creates indexes on these columns.

Conceptually, the genre index maps the entries of genres to a set of record identifiers S1 in the book table 12 that have this genre. In FIG. 16, the genre index maps the genre "crime" to a set of record identifiers S1 that includes the record identifiers 1 and 2. The genre index further maps the genre "fantasy" to a set of record identifiers S1' that includes the record identifier 3. Likewise, the language index maps language abbreviations such as "en" for English and "se" for Swedish to sets of record identifiers S2, S2', and thus identifies the book records with the corresponding language.

Now the processing of the user query for English crime novels considers making use of the indexes on book genre and language. The actions are illustrated in FIG. 16. FIG. 16 shows the user posting a query, and the database engine 10 with the data structures that it interacts with. The books table 12 resides on disk. Typically, indexes are small enough so that they can reside in memory during query evaluation. For simplicity, it is assumed that the books table 12 only contains the three entries shown in FIG. 15.

Referring to FIG. 16, the user posts a query (1), e.g. requests crime novels written in English. The database engine 10 parses the query, and proceeds as follows. The database engine 10 uses the index on "genre" to retrieve the first set of record identifiers S1 for crime novels (2a). Also, the database engine 10 uses the index on "language" to retrieve the second set of record identifiers S2 for English novels (2a). The database engine 10 computes the third set of record identifiers by set intersection on the first and second set S1, S2 (2b). The third set identifies all books that are English crime novels. The database engine 10 retrieves only those records with record identifiers from the third set (2c) from disk. The database engine 10 then returns the qualifying records to the user (2c).

Index-ANDing is effective for queries that are highly selective, i.e. the ratio of the third set and the cardinality of the books table are small. Database engines 10 maintain statistics to decide whether a given query is selective, and they only make use of indexes when they consider it worthwhile. Additionally, the size of the books table should be large. Then Index-ANDing is clearly preferable to full table scans in terms of I/O. Computing set intersection is costly in terms of CPU consumption. Offload this computation to an FPGA board 20, 20' is done by embodiments of the present invention.

Referring to FIG. 16, the database engine 10 passes the first and second set S1, S2 of record identifiers to the FPGA board 20, 20', if the characteristics of the first and second set S1, S2 are suitable. The first and second set S1, S2 of record identifiers contain discrete values that stem from a fixed interval IR [low, high]. This interval IR is known in advance. The first and second set S1, S2 fit into the large DRAM memory LM. The number of iterations $\lfloor (high-low)/|sM| \rfloor$ is relatively small in practice (e.g. up to three iterations). If these criteria are not met, then the database engine 10 computes Index-ANDing in the traditional way, by not offloading this computation onto the FPGA board 20, 20'.

Figure 17:
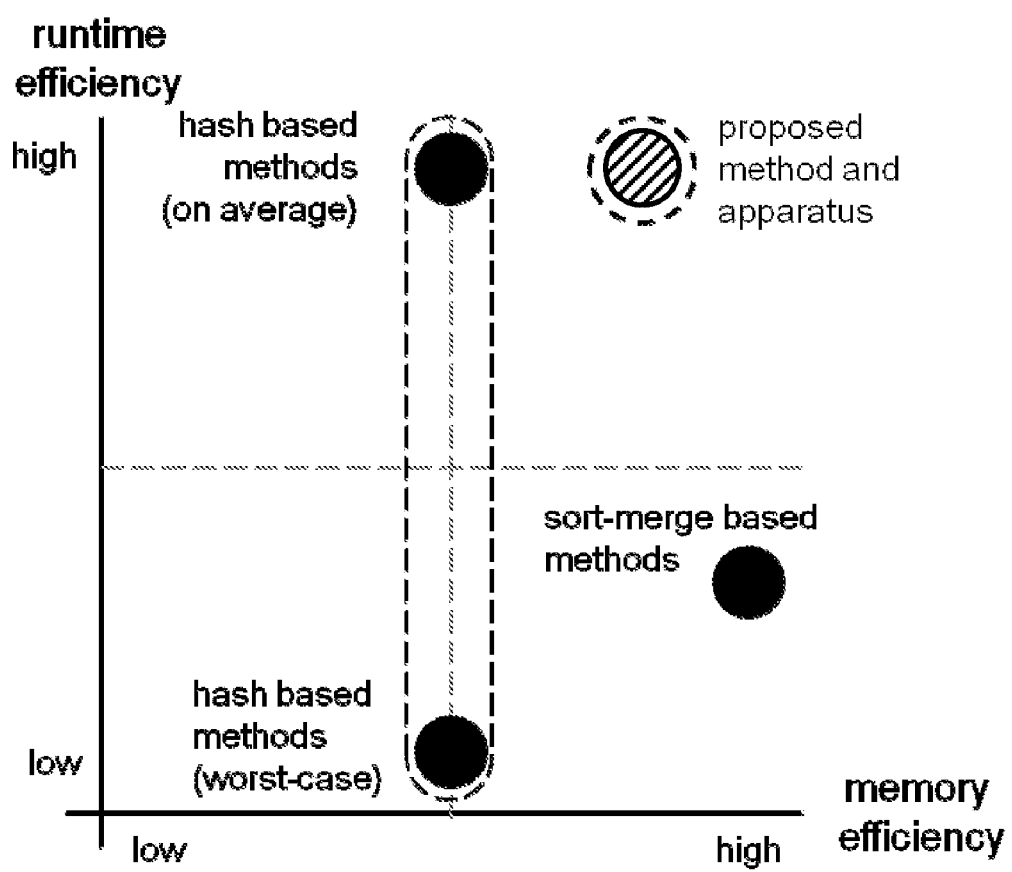
FIG. 17 is a schematic diagram illustrating relative tradeoffs in a solution space of runtime and memory efficiency.

FIG. 17 is a schematic diagram illustrating relative tradeoffs in a solution space of runtime and memory efficiency.

Referring to FIG. 17 embodiments of the present invention are compared against known solutions. Regarding runtime efficiency, hash based solutions show linear runtime performance on average, yet their worst-case performance is quadratic. This is even more expensive than the O(n_log n) performance of sort-merge based solutions. Regarding memory efficiency, sort-merge based solutions can be implemented in-place, thus making full use of the available memory resources.

In another embodiment of the present invention, a method for performing query processing in a database comprising a database engine maintaining a relational table with records comprising columns for a unique record identifier and further record information, and at least two property index tables each mapping entries of a corresponding information column to a set of record identifiers in the relational table having the property index, comprises receiving a posted query; parsing and analyzing the query for retrieving available property index tables for performing Index-ANDing; looking up a first set of record identifiers from a first property index table and second set of record identifiers from a second property index table; checking if first and second set are suitable for offloading calculation of an intersection set of record identifiers from the database engine to a acceleration unit; performing offloading of the first and second set to the acceleration unit for performing the above described method for computing set intersection of a first and a second unordered set of discrete members, if the first and second set are suitable for offload calculation; else using the database engine for computing the intersection set of the first and second set; using the computed intersection set to fetch qualified records from the database; and outputting the qualified records as query result.

Further embodiments of the present invention, comprise post-processing of the qualified records using the database engine before outputting the qualified records.

Further embodiments of the present invention, comprise calculating a decision factor based on the first and second set of record identifiers, and comparing the decision factor with a threshold value for checking suitability of the first and second set for offload calculation of the intersection set of record identifiers.

In another embodiment of the present invention, an acceleration unit for computing set intersection of a first and a second unordered set of discrete members that stem from a known input range of consecutive discrete numbers comprises a control logic; at least one first random access memory; at least one second random access memory; an interface to a communication bus for communication with a host computer; wherein the at least one first random access memory comprises a larger capacity than the at least one second random access memory, but slower or equal access rate; wherein the control logic writes set members of the first set and the second set received on the communication bus separated into the at least one first random access memory; partitions the input range into sub ranges, each comprising as many set members as there are bits available in the at least one second random access memory, and performs iteratively for each sub range of consecutive discrete numbers the following steps of a conquer-phase: Initializing the at least one second random access memory representing at least one bit vector by setting all bits to a certain first logical level (0); comparing iteratively all set members in the first set with the corresponding sub range; addressing directly the at least one second random access memory for each number (i) in the first set that is also set member of the corresponding sub range and flipping a bit at position (i) of the at least one second random access memory to a second logical level (1); comparing iteratively all set members in the second set with the corresponding sub range; and writing each number (j) of the second set that is also set member of the sub range directly to an output if a position (j) of the at least one bit vector is set to the second logical level (1).

In further embodiments of the present invention, the control logic skips the comparison step of all set members in the second set with the corresponding sub range as part of the conquer-phase, if the at least one bit vector of the corresponding sub range carries only bits on the first logical level (0) after performing the direct addressing step.

Further embodiments of the present invention, comprise (n) second random access memories performing steps of the conquer-phase concurrently for (n) sub ranges.

In another embodiment of the present invention, a data processing system for performing query processing in a database comprises a database engine maintaining a relational table with records comprising columns for a unique record identifier and further record information, and comprising at least two property index tables each mapping entries of a corresponding information column to a set of record identifiers in the relational table having the property index, the above described acceleration unit for computing set intersection of a first and a second unordered set of discrete members; a communication bus connecting the acceleration unit with the database engine.

In another embodiment of the present invention, a data processing program for execution in a data processing system comprises software code portions for performing a method for computing set intersection of a first and a second unordered set of discrete members or a method for performing query processing in databases when the program is run on the data processing system.

In yet another embodiment of the present invention, a computer program product stored on a computer-usable medium, comprises computer-readable program means for causing a computer to perform a method for computing set intersection of a first and a second unordered set of discrete members or a method for performing query processing in databases when the program is run on the computer.

All in all, embodiments of the present invention address the problem of computing set intersection. That is, given two sets of numeric identifiers, the task is to compute a third set that contains all identifiers that occur in both the first and the second set. Embodiments of the present invention concern the particular instance of the set intersection problem that the members of the first and the second set are discrete values. The first and second sets are subsets of an interval known in advance. No order is required among the members of the first, second, or third set.

Embodiments of the present invention pay respect to both runtime and memory efficiency. Ideally, a solution targeted at hardware accelerators such as FPGA boards approaches the linear runtime performance of the hash based approaches, while being more parsimonious with the available memory resources.

The core idea of the present invention is writing the first and second set into a larger but slower random access memory unit. Then partition the input range into sub ranges, where a sub range has as many elements as there are bits available in a small but fast random access memory unit. The sub range containing the maximum value of input range may only partially overlap with input range. For each sub range, a sequence of three steps is executed. First, the small but fast random access memory unit is initialized by setting all bits to a logical low level (0). Then, direct addressing is performed for all members of the first set that are also members of the sub range. The small but fast random access memory unit functions as a bit vector, with the i-th bit flipped to a logical high level (1) if the i-th position in the sub range is also a member of the first set. Then, probing is performed for all members of the second set that are also members of the sub range. If the i-th bit in the small but fast random access memory has been set to the logical high level (1) during direct addressing, and if the i-th position in the sub range is also a member of the second set, then this member (i) is output to the communication bus as a member of the third set.

Embodiments of the present invention also employ an accelerator board that is connected to a host computer by means of a communication bus. The accelerator board carries accelerator hardware. The accelerator board further carries units of on-board memory that form a memory hierarchy of a first memory of small capacity but fast random access rates and a second memory of larger capacity but slower random access rates.

Embodiments of the present invention make efficient use of the architecture characteristics of the accelerator board, by exploiting the fast access rates for random access to the small but fast memory to the fullest, and using the large but slow memory for storage purposes mainly.

Embodiments of the present invention compare favorably with respect to runtime efficiency and memory efficiency. The asymptotic runtime behavior is linear in the size of the input. This is an upper bound, whereas with hash based solutions, this does not hold in the worst case. The linear runtime performance of embodiments of the present invention is driven by a constant factor $f=\lceil (high-low)/|sM| \rceil$, the number of iterations of the sequence "initialize—direct addressing—probing." Provided that this factor is small, embodiments of the present invention show excellent runtime performance.

While not an in-place method, embodiments of the present invention still require less memory for additional data structures than a hash based solution. In implementing a hash based solution on embodiments of the present invention, the most natural strategy is to use the small memory sM as hash table, store the first and second input set in the large memory LM, and maintain a mapping between slots in the hash table and set members in LM.

Embodiments of the present invention work with direct addressing instead of hashing, so there is no need for dealing with any collisions due to hashing. Consequently, no data structures to map entries in second memory sM to entries in first memory LM need to be maintained. Instead of maintaining these additional data structures, embodiments of the present invention can use the available memory to store additional input data. This means that embodiments of the present invention can handle larger inputs. Moreover, embodiments of the present invention make efficient use of the fast memory sM, where random access occurs, and accesses the slower memory LM only sequentially. This leverages the efficiency of memory access to the fullest. Therefore, the memory efficiency is expected to be higher with embodiments of the present invention when compared to a hash based solution. In comparison to a sort-merge based approach, the memory efficiency of embodiments of the present invention is slightly worse, since the former can be implemented in-place, and therefore can also use the smaller memory sM for storing the input, while embodiments of the present invention only use the larger memory LM for storing input data.

Overall, embodiments of the present invention satisfy the goals in terms of runtime and memory efficiency.

The introduced decision factor f is impacting the linear runtime of embodiments of the present invention. If input sets are small, and sparsely but evenly distributed over a large interval [low, high], the decision factor f will be increased. Under these circumstances, embodiments of the present invention may show suboptimal performance, and may be outperformed by a simple sort-merge or hash based solution.

Advantageously the factor f can be easily computed in advance to offloading a set intersection computation onto the accelerator unit. A scheduler of some sort can compute the factor f, and use it as a decision basis whether a set intersection problem is to be offloaded, or computed on the host computer in the traditional way, using a purely software-based solution.

Embodiments of the present invention can be implemented as entire software embodiments, as entire hardware embodiments or as embodiment containing both hardware and software elements.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

We claim:

1. A computer program product for computing a set intersection of sets of numbers, the computer program product comprising a computer readable storage device having computer readable program code embodied therewith, the computer readable program code comprising:
    computer readable program code configured with an interface for computing a set intersection and returning the set intersection to an application calling the interface;
    the interface configured to receive as input a first set of discrete numbers in an input range and a second set of discrete numbers in the input range;
    the interface configured to separate the input range into one or more sub ranges to cover the input range and configured to process a first one of the one or more sub ranges by initializing bits of a first memory to a first logical state, the first memory having at least a corresponding bit for each respective discrete number that may be received within the first sub range, and wherein the processing includes changing the initial state of each of the bits in the first memory corresponding to a received number of the first set that is within the first sub range;
    the interface configured to compare each number received in the second set to a corresponding bit in the first memory to identify a set of received numbers that are in the first sub range and that are in both the first set and the second set, wherein the comparing is responsive to detecting a change of initial state of any bit in the first memory during the processing of the first sub range; and
    the interface configured to repeat the processing and the comparing for each remaining one of the one or more sub ranges and to return to the application a set of received numbers that are in both the sets.

2. The computer program product of claim 1, wherein the computer readable program code is also configured to detect an absence of change of initial state for all bits processed in the first memory during the processing of the first sub range, wherein responsive to detecting the absence the interface does not compare each number received in the second set to a corresponding bit in the first memory.

3. The computer program product of claim 1, wherein the computer readable program code is also configured such that at least two sub ranges are processed concurrently.

4. The computer program product of claim 1, wherein the computer readable program code is also configured with a second memory having a larger capacity than the first memory, the second memory having a slower or equal access rate than the first memory, wherein the computer readable program code is configured to write all received numbers from the first and second sets into the second memory.

5. The computer program product of claim 4, wherein the computer readable program code is also configured to write the received numbers of the first set starting from a first end of the second memory toward a second end of the second memory and to write the received numbers of the second set starting from the second end of the second memory toward the first end of the second memory.

6. The computer program product of claim 5, wherein the computer readable program code is also configured to write a symbol following a last bit in the first sub range in the second memory.

7. The computer program product of claim 1, wherein the computer readable program code is also configured such that an application requesting the intersection is a database application;
    the database application having computer readable program code configured to maintain a relational table with records comprising columns for a unique record identifier, a first property index table with a first set of record identifiers from the first property index table, a second set of record identifiers from a second property index table, and a query suitable for Index-ANDing;
    the database application further configured to call the interface with first set of record identifiers and the second set of record identifiers and receive a third set of record identifiers being the intersection; and
    the database application further configured to fetch a set of records from the database utilizing the third set of record identifiers, and to return the set of records as a query result.

8. The computer program product of claim 7, wherein the computer readable program code is also configured to post process the set of records before returning the set of records for the query.

9. A method for computing a set intersection of sets of numbers comprising:
    providing an interface for computing an intersection of sets of numbers, the interface:
    receiving as input by a processing apparatus a first set of discrete numbers that stem from an input range of consecutive discrete numbers and a second set of discrete numbers that stem from the input range;
    separating the input range into a one or more sub ranges to cover the input range;
    processing by the processing apparatus a first one of the one or more sub ranges by initializing bits of a first memory to a first logical state, the first memory having at least a corresponding bit for each respective discrete number that may be received within the first sub range, and wherein the processing includes changing the initial state of each of the bits in the first memory corresponding to a received number that is in the first set and that is within the first sub range;
    comparing by the processing apparatus each number received in the second set to a corresponding bit in the first memory to identify a set of received numbers that are in the first sub range and that are in both the first set and the second set S2, wherein the comparing is responsive to detecting a change of initial state of any bit in the first memory during the processing of the first sub range; and repeating the processing and the comparing for each remaining one of the one or more sub ranges; and returning, by the processing apparatus to an application, a set of received numbers that are in both the sets.

10. The method of claim 9 further comprising:

detecting an absence of change of state in the first memory during the processing of the first sub range, wherein responsive to detecting the absence the interface does not compare each number received in the second set to a corresponding bit in the first memory.

11. The method of claim 9 further comprising processing concurrently more than one of the sub ranges.

12. The method of claim 9 further comprising:

writing all received numbers from first and second sets into a second memory having a larger capacity than the first memory, the second memory having a slower or equal access rate than the first memory.

13. The method of claim 12 further comprising:

writing the received numbers of the first set starting from a first end of the second memory toward a second end of the second memory; and writing the received numbers of the second set starting from the second end of the second memory toward the first end of the second memory.

14. The method of claim 9, wherein an application utilizing the interface is a database application, the method further comprising:

maintaining a relational table with records comprising columns for a unique record identifier, a first property index table with a first set of record identifiers from the first property index table, a second set of record identifiers from a second property index table;

processing a query suitable for Index-ANDing;

utilizing the interface for requesting the intersection of the first set of record identifiers and the second set of record identifiers to get a third set of record identifiers being the intersection;

fetching a set of records from the database utilizing the third set of record identifiers; and returning the set of records as a query result.

15. A system for computing a set intersection of sets of numbers comprising:

a first processor;

an application running on the first processor;

a second processor;

an interface for computing intersections of numbers;

the interface further configured for accepting as input a first set of discrete numbers in an input range and a second set of discrete numbers in the input range, the interface returns a third set of discrete numbers being the intersection of the first set of numbers and the second set of numbers;

the interface further configured to execute portions of its code on a plurality of processors including the second processor;

the interface further configured to separate the input range into a one or more sub ranges to cover the input range;

the interface further configured to process a first one of the one or more sub ranges from the input range by initializing bits of a first memory to a first logical state, the first memory having at least a corresponding bit for each respective discrete number that may be received within the first sub range, and wherein the processing includes changing the initial state of each of the bits in the first memory corresponding to a received number of the first set that is within the first sub range;

the interface further to compare each number received in the second set to a corresponding bit position in the first memory to identify a set of received numbers that are in the first sub range and that are in both of the first set and the second set;

the interface further configured to repeat the processing and the comparing for each remaining one of the one or more sub ranges and to return to the application a set of received numbers that are in both the sets; and the application configured to call the interface.

16. The system of claim 15 further comprising:

the interface configured to detect an absence of change of initial state for all bits processed in the first memory during the processing of the first sub range, wherein responsive to detecting the absence the interface does not compare each number received in the second set to a corresponding bit in the first memory.

17. The system of claim 15 further comprising:

the interface configured for processing at least two sub ranges concurrently.

18. The system of claim 15 further comprising:

the interface configured to write all received numbers from the first and second sets into a second memory having a larger capacity than the first memory, the second memory having a slower or equal access rate than the first memory.

19. The system of claim 18 further comprising:

the interface configured to write the received numbers of the first set starting from a first end of the second memory toward a second end of the second memory; and the interface configured to write the received numbers of the second set starting from the second end of the second memory toward the first end of the second memory.

20. The system of claim 15, wherein an application requesting the intersection is a database application configured with:

a relational table with records comprising columns for a unique record identifier, a first property index table with a first set of record identifiers from the first property index table, a second set of record identifiers from a second property index table;

a query suitable for Index-ANDing with the intersection being the first set of record identifiers and the second set of record identifiers and a third set of record identifiers being the intersection; and a set of records constructed from the third set of records; and the set of records being query results.

* * * * *